United States Patent
Peng et al.

(10) Patent No.: US 11,834,880 B2
(45) Date of Patent: Dec. 5, 2023

(54) THINNED HINGE

(71) Applicant: Sinher Technology Inc., New Taipei (TW)

(72) Inventors: Chih-Huang Peng, New Taipei (TW); Nan-Hai Lai, New Taipei (TW)

(73) Assignee: SINHER TECHNOLOGY INC., New Taipei (TW)

(*) Notice: Subject to any disclaimer, the term of this patent is extended or adjusted under 35 U.S.C. 154(b) by 399 days.

(21) Appl. No.: 17/358,466

(22) Filed: Jun. 25, 2021

(65) Prior Publication Data

US 2022/0412138 A1    Dec. 29, 2022

(51) Int. Cl.
*E05D 3/12* (2006.01)
*E05D 11/08* (2006.01)

(52) U.S. Cl.
CPC ............ *E05D 3/122* (2013.01); *E05D 11/082* (2013.01)

(58) Field of Classification Search
CPC .............................. E05D 3/122; E05D 11/082
See application file for complete search history.

(56) References Cited

U.S. PATENT DOCUMENTS

| | | | | |
|---|---|---|---|---|
| 10,152,094 B1* | 12/2018 | Holung | .................. | G06F 1/1681 |
| 10,563,438 B1* | 2/2020 | Chen | .......................... | E05D 5/10 |
| 11,680,601 B1* | 6/2023 | Yao | .......................... | F16C 11/04 |
| | | | | 16/233 |
| 11,761,476 B2* | 9/2023 | Lin | .......................... | F16C 11/04 |
| | | | | 16/233 |
| 2016/0011632 A1* | 1/2016 | Hsu | ........................ | H04M 1/022 |
| | | | | 16/354 |
| 2016/0032633 A1* | 2/2016 | Hsu | .......................... | E05D 3/122 |
| | | | | 16/368 |
| 2019/0250675 A1* | 8/2019 | Lin | ...................... | E05D 11/0054 |
| 2020/0064890 A1* | 2/2020 | Siddiqui | ............... | G06F 1/1681 |
| 2020/0081501 A1* | 3/2020 | Lin | ........................ | G06F 1/1681 |
| 2020/0409427 A1* | 12/2020 | Hsu | .......................... | E05D 1/04 |
| 2021/0096607 A1* | 4/2021 | Hallar | .................. | G06F 1/1681 |
| 2021/0156416 A1* | 5/2021 | Lin | ........................ | F16C 11/04 |
| 2022/0365572 A1* | 11/2022 | Yang | ...................... | E05D 3/122 |
| 2023/0161387 A1* | 5/2023 | Yao | .......................... | F16C 11/04 |
| | | | | 16/233 |
| 2023/0202803 A1* | 6/2023 | Cortes | ................. | B66B 11/0226 |
| | | | | 187/401 |
| 2023/0273649 A1* | 8/2023 | Hsu | ........................ | G06F 1/1681 |
| | | | | 16/354 |

* cited by examiner

*Primary Examiner* — Jason W San
(74) *Attorney, Agent, or Firm* — Muncy, Geissler, Olds & Lowe, P.C.

(57) ABSTRACT

A thinned hinge includes a rotating part and a torsion supply part. The rotating part includes a base and two movable members arranged on the base, the base includes two tracks for the movable members to displace along arc-shaped trajectories to generate opening and closing actions, and ends of the two movable members where extend outward from the two tracks are provided with driving members. The torsion supply part supplies torsion required by the rotating part, the torsion supply part includes a support, two rotating shafts arranged in parallel on the support, and an idle gear arranged between the two rotating shafts, the two rotating shafts are provided with connecting pieces assembled with the driving members to enable the torsion supply part and the rotating part to simultaneously act and gears engaged with the idle gear, and the gears and the idle gear are crossed helical gear structures.

9 Claims, 4 Drawing Sheets

THINNED HINGE

FIELD OF THE INVENTION

The present invention relates to a thinned hinge, more particularly, to a thinned hinge which has torsion when being used.

BACKGROUND OF THE INVENTION

With the evolution of market trend, a screen of a handheld electronic device, such as a smart phone and a tablet computer, is continuously improved towards high resolution and large size, so that a consumer can achieve a better appreciation effect and controllability on either movie appreciation or mobile game entertainment, but the trouble of inconvenience in carrying is also derived due to the large computer body. Therefore, a flexible screen gradually attracts the attention of mobile phone manufacturers, and is applied from the field of household televisions and computer screens to the field of smart phones and tablet computers, and further, folding smart phones and tablet computers are developed according to the flexible screen, so that the effects of large-sized screen and convenience in carrying are achieved. This kind of intelligent product has the material characteristics of high resolution and capability of bearing repeated folding and unfolding of the flexible screen, in addition, a computer body for bearing the flexible screen and a hinge connected with the computer body also play important roles.

In view of this, generally, for a hinge for a flexible screen, an assembly generating torsion may be arranged in a hinge structure in order to improve the torsion required when the screen is folded. For example, a rotating shaft of the hinge is provided with a torsion assembly for supplying the torsion required when the screen is folded. However, if the hinge is provided with the assembly generating the torsion, the overall design difficulty and the assembly complexity of the hinge will be greatly improved, and therefore, how to produce a hinge suitable for the folding of the flexible screen and concise in overall member assembly and design becomes an issue to be solved by relevant industries.

SUMMARY OF THE INVENTION

The present invention mainly aims at solving the problem that an assembly generating torsion has to be arranged in an ordinary hinge structure, or else, the torsion cannot be generated when a hinge acts.

In order to achieve the above-mentioned purpose, the present invention provides a thinned hinge. The thinned hinge includes a rotating part and a torsion supply part, wherein the rotating part includes a base and two movable members arranged on the base, the base forms with two tracks allowing the movable members to displace along arc-shaped trajectories, the two movable members generate opening and closing actions during displacing along the arc-shaped trajectories, and one end of each of the two movable members where extends outward from one of the two tracks is provided with a driving member. The torsion supply part supplies torsion required when the rotating part is implemented, the torsion supply part includes a support, two rotating shafts arranged in parallel on the support, and an idle gear arranged between the two rotating shafts, each of the two rotating shafts is provided with a connecting piece assembled with one of the two driving members to enable the torsion supply part and the rotating part to simultaneously act and a gear engaged with the idle gear, and the two gears and the idle gear are crossed helical gear structures.

In an embodiment, the torsion supply part includes two torsion spring sets respectively arranged at one end of each of the two rotating shafts.

In an embodiment, the torsion supply part includes at least one auxiliary plate to provide the two rotating shafts for passing through so as to stabilize the two rotating shafts for rotation together with the support.

In an embodiment, the idle gear is provided with a positioning hole, the support is provided with a first plate and a second plate perpendicular to the first plate and used for arranging the idle gear, the first plate is provided with two shaft mounting holes allowing the two rotating shafts to penetrate, and the second plate is provided with an idle gear fixing hole communicating with the positioning hole to arrange a fixing piece when the idle gear is arranged on the second plate.

In an embodiment, the support is assembled with the base.

In an embodiment, the support is provided with a first assembling block arranged on the second plate, and the base is provided with a second assembling block arranged at one side of the base and capable of realizing assembly with the first assembling block.

In an embodiment, an arc-shaped rib is arranged in two inner walls of each of the two tracks, and an arc-shaped groove arranged in two side walls of each of the two movable members is provided for disposal of the arc-shaped rib therein.

In an embodiment, each of the two tracks is provided with an opening, and two openings of the two tracks are located at two sides of the base.

In an embodiment, the driving member is formed with a sliding rail part to provide for disposal of one end of the connecting piece therein, and the connecting pieces is capable of performing a reciprocating slip action relative to the sliding rail parts.

According to the above descriptions of the present invention, compared with the known hinge, the thinned hinge has the following characteristics that the gears of the two rotating shafts and the idle gear are of the crossed helical gear structures, so that torsion required during rotation can be supplied by engagement between the gear structures without changing a design architecture of an overall member.

DETAILED DESCRIPTION OF THE PREFERRED EMBODIMENTS

Figure 1:
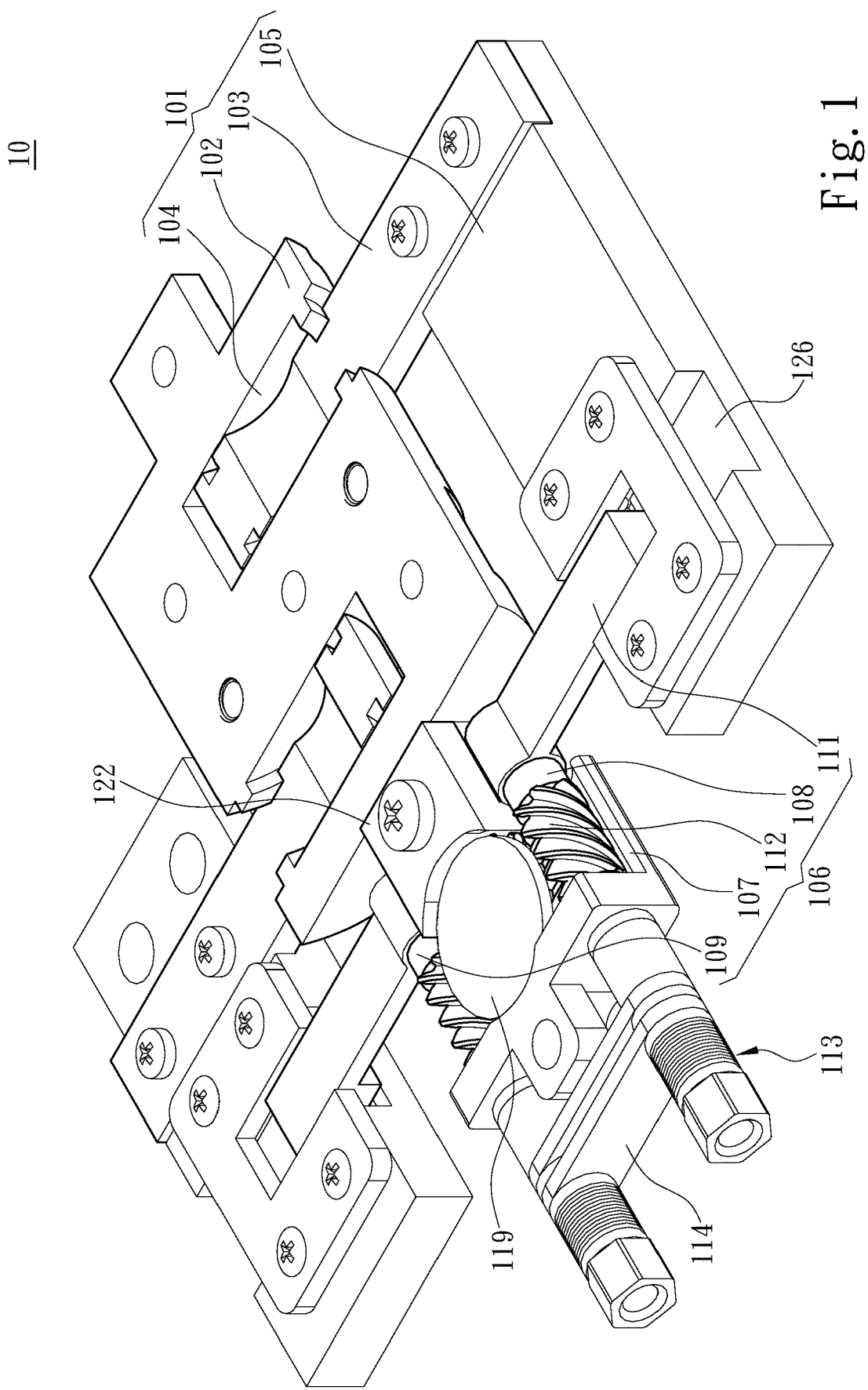
FIG. 1 schematically shows a three-dimensional outside view in an embodiment of the present invention.
Figure 2:
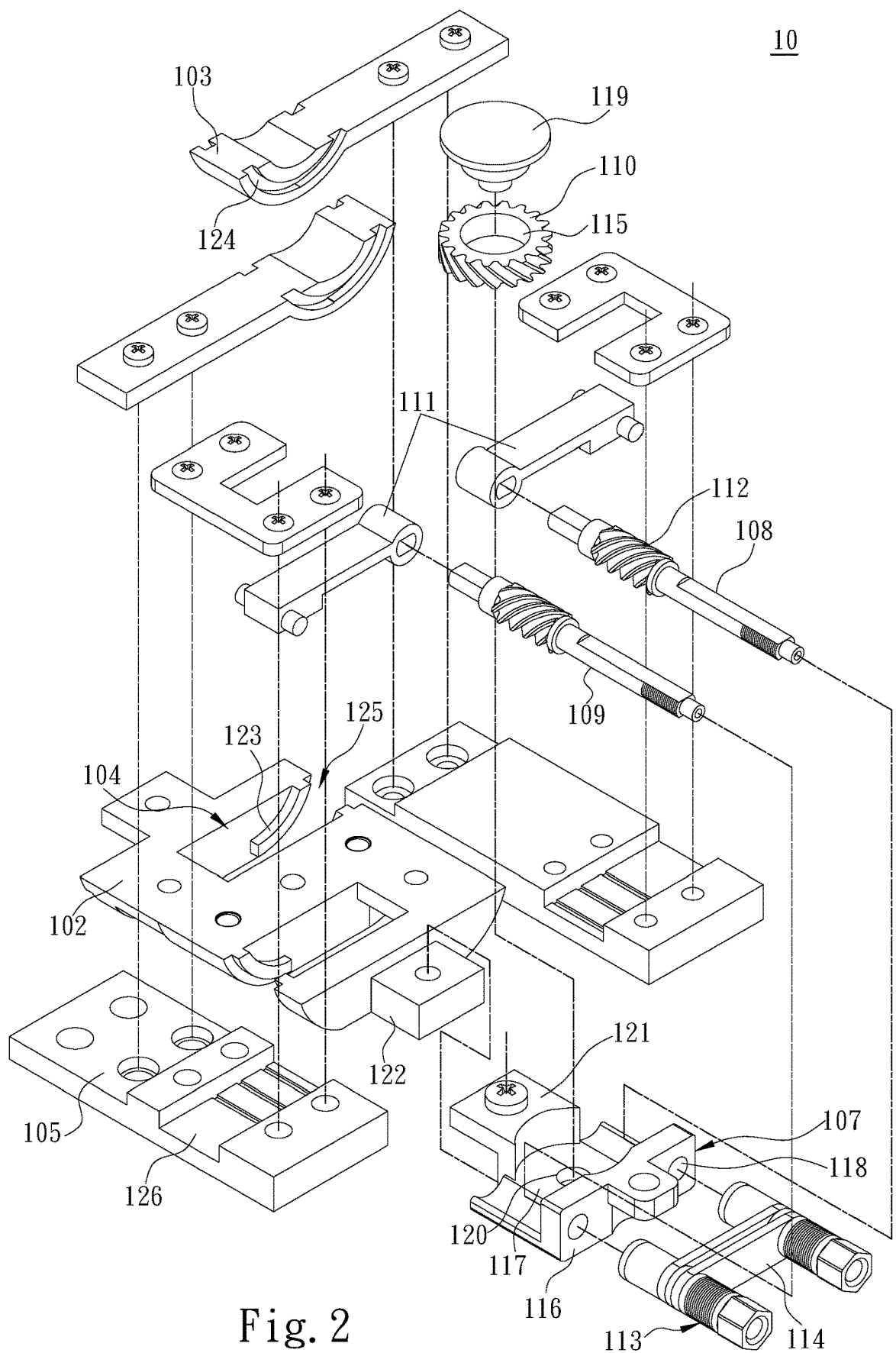
FIG. 2 schematically shows a first exploded view in an embodiment of the present invention.
Figure 3:
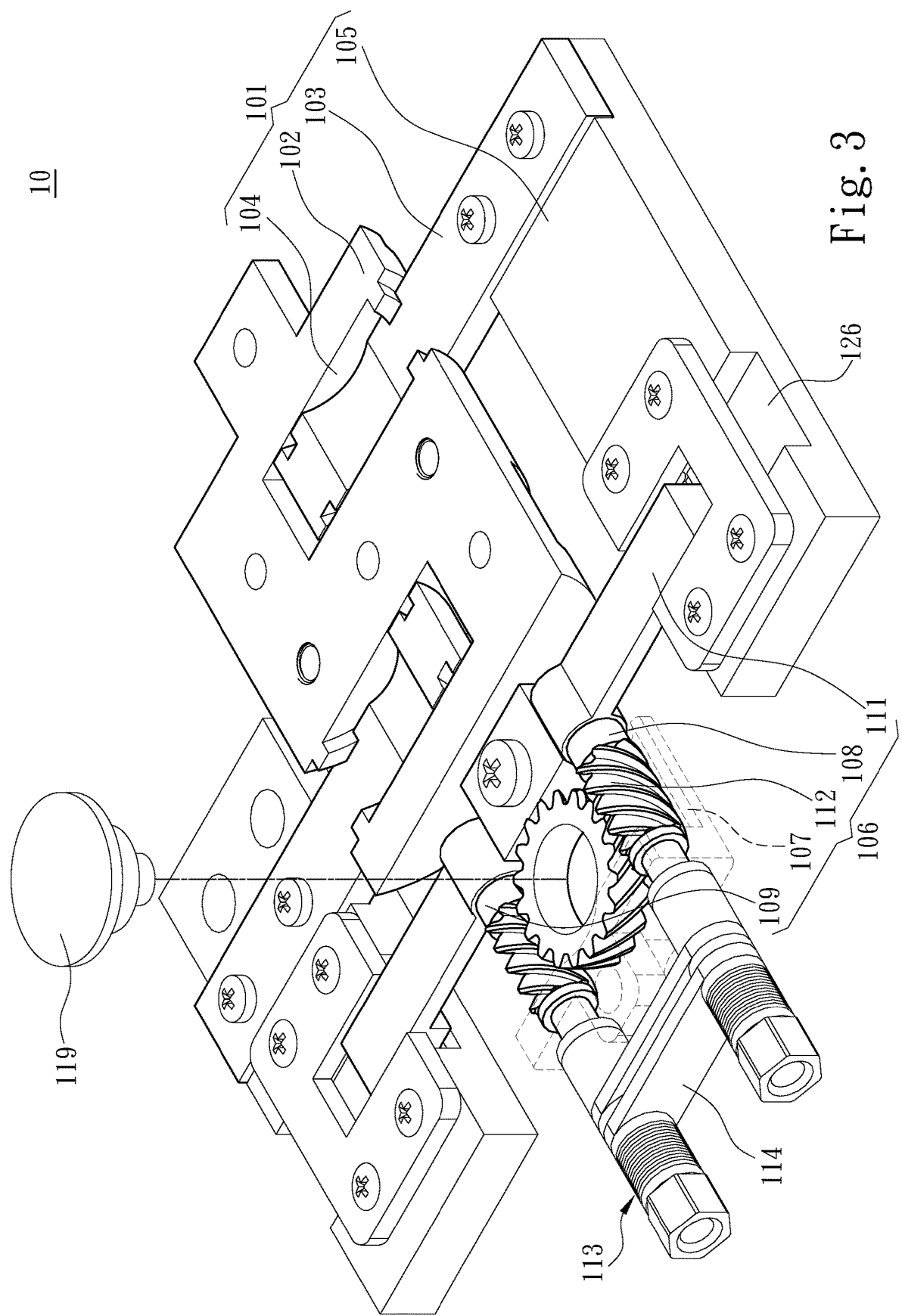
FIG. 3 schematically shows a second exploded view in an embodiment of the present invention.
Figure 4:
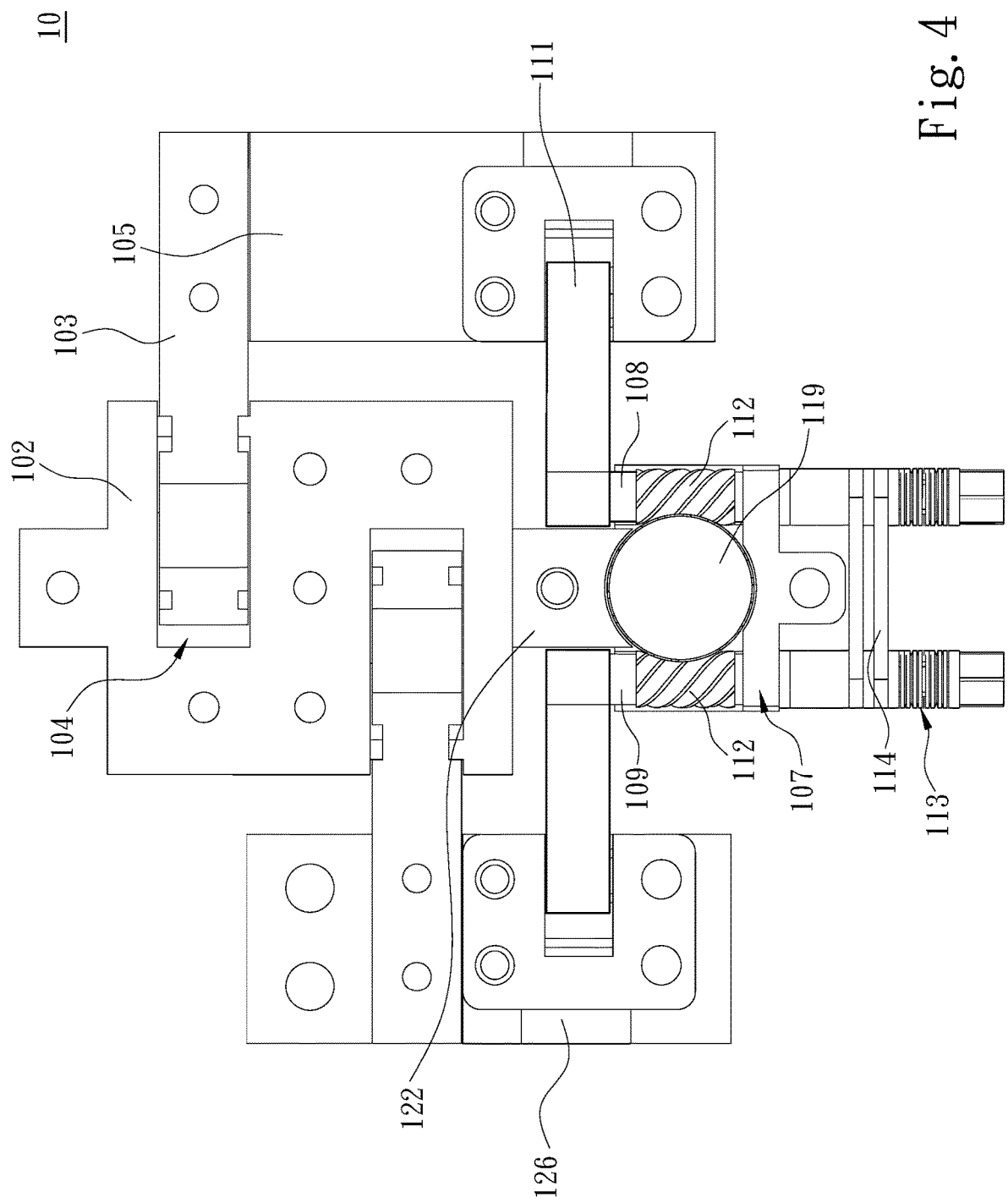
FIG. 4 schematically shows a top view in an embodiment of the present invention.

Detailed descriptions and technical contents of the present invention will be shown as follows with reference to the accompanying drawings:

referring to FIG. 1, FIG. 2, FIG. 3 and FIG. 4, the present invention provides a thinned hinge. The thinned hinge 10 includes a rotating part 101 and a torsion supply part 106, wherein the rotating part 101 includes a base 102 and two movable members 103 arranged on the base 102, wherein the base 102 forms with two tracks 104 allowing the two movable members 103 to displace along arc-shaped trajectories, the two movable members 103 are arranged in the two tracks 104 and are capable of displacing in the two tracks 104 along the arc-shaped trajectories, thus, the two movable members 103 will generate opening and closing actions during displacing along the arc-shaped trajectories relative to the two tracks 104. In an embodiment, each of two inner walls of each of the two tracks 104 is provided with an arc-shaped rib 123, and each of two side walls of each of the two movable members 103 is provided with an arc-shaped groove 124 for disposal of the arc-shaped ribs 123. Moreover, each of the two tracks 104 is provided with an opening 125, and the two openings 125 of the two tracks 104 are located at two sides of the base 102. One end of each of the two movable members 103 extending outward from one of the two tracks 104 is provided with a driving member 105. The torsion supply part 106 supplies torsion required when the rotating part 101 is implemented. Specifically, the torsion supply part 106 may generate torsion when the rotating part 101 acts, and the rotating part 101 acts more smoothly due to the supply of the generated torsion. In addition, the torsion supply part 106 includes a support 107, two rotating shafts 108, 109 arranged in parallel on the support 107, and an idle gear 110 arranged between the two rotating shafts 108, 109. In an embodiment, the idle gear 110 is provided with a positioning hole 115, the support 107 is provided with a first plate 116 and a second plate 117 perpendicular to the first plate 116 and provided for arranging the idle gear 110, the first plate 116 is provided with two shaft mounting holes 118 allowing the two rotating shafts 108, 109 to pass through, and the second plate 117 is provided with an idle gear fixing hole 120 communicating with the positioning hole 115 when the idle gear 110 is arranged to arrange a fixing piece 119. In an embodiment, the support 107 is provided with a first assembling block 121 arranged on the second plate 117, and the base 102 is provided with a second assembling block 122 arranged at one side of the base 102 and capable of realizing assembly with the first assembling block 121. The first assembling block 121 extends to be formed at one end of the second plate 117 and is formed in a way of facing the first plate 116, and the second assembling block 122 is formed on the base 102 and faces one end of the first assembling block 121, and the first assembling block 121 and the second assembling block 122 are formed into structures which can be matched and assembled with each other, so that the support 107 and the base 102 can be assembled by virtue of the combination of the first assembling block 121 and the second assembling block 122. Each of the two rotating shafts 108, 109 is provided with a connecting piece 111 assembled with the driving member 105 to enable the torsion supply part 106 and the rotating part 101 to act at the same time, more generally speaking, the two rotating shafts 108, 109 are respectively assembled with two driving members 105 by two connecting pieces 111, and therefore, when the driving members 105 act, the rotating part 101 and the torsion supply part 106 can be linked by the two movable members 103 and the two connecting pieces 111 to act at the same time. Each of the two rotating shafts 108, 109 is provided with a gear 112 engaged with the idle gear 110, and two gears 112 and the idle gear 110 are crossed helical gear structures. In order to improve the stability when the two rotating shafts 108, 109 act, in an embodiment, the torsion supply part 106 includes at least one auxiliary plate 114 allowing the two rotating shafts (108, 109) to pass through so as to stabilize the two rotating shafts (108, 109) for rotation together with the support 107.

Action processes of the rotating part 101 and the torsion supply part 106 will be described in detail as below: referring to FIG. 1, FIG. 2, FIG. 3 and FIG. 4, the two driving members 105 are respectively assembled with the base 102 and the support 107 by the two movable members 103 and the two connecting pieces 111 so that the two driving members 105 are linked with the rotating part 101 and the torsion supply part 106. When one of the two driving members 105 is stressed, one of the two movable members 103 and one of the two connecting pieces 111 are simultaneously driven by one of the two driving members 105 to rotate, so that the two movable member 103 is capable of displacing relative to one of the two tracks 104 of the base 102 along an arc-shaped trajectory, and one of the two connecting pieces 111 can be linked with one of the two rotating shafts 108 to rotate. When one of the two rotating shafts 108 is linked by one of the two connecting pieces 111 to rotate, one of the two rotating shafts 108 can drive the idle gear 110 to act by virtue of the gear 112, so that the idle gear 110 is linked with the other one of the two rotating shafts 109 to rotate. Known from above, the rotating part 101 can generate opening and closing actions under the link of the two driving members 105, and if the two driving members 105 are stressed to link the two movable members 103 to rotate, since the idle gear 110 arranged on the torsion supply part 106 and the two rotating shafts 108, 109 are crossed helical gear structures, when the two rotating shafts 108, 109 rotate by engagement of the gears 112 and the idle gear 110, the torsion supply part 106 can generate torsion by virtue of a helical gear so as to supply the torsion required when the rotating part 101 is implemented. To sum up, it can be seen that the torsion required when the hinge 10 acts can be supplied by virtue of the crossed helical gear structures of the gears 112 and the idle gear 110 without changing the design of an original hinge structure. In addition, in order to further supply an optimal torsion required when the thinned hinge 10 acts, in an embodiment, the torsion supply part 106 includes two torsion spring sets 113 respectively arranged at one end of each of the two rotating shafts 108, 109 to provide a better torsion generation effect for the thinned hinge 10. Moreover, in an embodiment, a sliding rail part 126 in which one end of each of the two connecting pieces 111 is arranged is formed on each of the two driving members 105, and the two connecting pieces 111 are capable of performing a reciprocating slip action relative to the sliding rail parts 126.

What is claimed is:

1. A thinned hinge, comprising:
   a rotating part, comprising a base and two movable members arranged on the base, wherein the base forms with two tracks allowing the two movable members to displace along arc-shaped trajectories, the two movable members generate opening and closing actions during displacing along the arc-shaped trajectories, and one end of each of the two movable members where extends outward from one of the two tracks is provided with a driving member; and
   a torsion supply part, supplying torsion required when the rotating part is implemented, wherein the torsion supply part comprises a support, two rotating shafts arranged in parallel on the support, and an idle gear arranged between the two rotating shafts, each of the two rotating shafts is provided with a connecting piece assembled with one of the two driving members to enable the torsion supply part and the rotating part to simultaneously act and a gear engaged with the idle gear, and the two gears and the idle gear are crossed helical gear structures.

2. The thinned hinge of claim 1, wherein the torsion supply part comprises two torsion spring sets respectively arranged at one end of each of the two rotating shafts.

3. The thinned hinge of claim 2, wherein the torsion supply part comprises at least one auxiliary plate to provide the two rotating shafts for passing through so as to stabilize the two rotating shafts for rotation together with the support.

4. The thinned hinge of claim 1, wherein the idle gear is provided with a positioning hole, the support is provided with a first plate and a second plate perpendicular to the first plate and provided for arranging the idle gear, the first plate is provided with two shaft mounting holes allowing the two rotating shafts to penetrate, and the second plate is provided with an idle gear fixing hole communicating with the positioning hole to arrange a fixing piece when the idle gear is arranged on the second plate.

5. The thinned hinge of claim 4, wherein the support is assembled with the base.

6. The thinned hinge of claim 5, wherein the support is provided with a first assembling block arranged on the second plate, and the base is provided with a second assembling block arranged at one side of the base and capable of realizing assembly with the first assembling block.

7. The thinned hinge of claim 1, wherein an arc-shaped rib is arranged in two inner walls of each of the two tracks, and an arc-shaped groove arranged in two side walls of each of the two movable members is provided for disposal of the arc-shaped rib therein.

8. The thinned hinge of claim 7, wherein each of the two tracks is provided with an opening, and two openings of the two tracks are located at two sides of the base.

9. The thinned hinge of claim 7, wherein the driving member is formed with a sliding rail part to provide for disposal of one end of the connecting piece therein, and the connecting piece is capable of performing a reciprocating slip action relative to the sliding rail parts.

\* \* \* \* \*